April 7, 1953  J. HECK, SR  2,634,034

POLE CARRIER FOR VEHICLE BODIES

Filed Feb. 19, 1951

INVENTOR.
JOHN HECK, SR.

BY
Wm. H. Dean
AGENT

Patented Apr. 7, 1953

2,634,034

UNITED STATES PATENT OFFICE 2,634,034

POLE CARRIER FOR VEHICLE BODIES

John Heck, Sr., San Diego, Calif.

Application February 19, 1951, Serial No. 211,740

3 Claims. (Cl. 224—42.1)

My invention relates to a pole carrier for vehicle bodies, and the objects of my invention are:

First, to provide a pole carrier of this class which may be readily and easily connected to the drain trough of an automobile body above the doors thereof, for carrying poles and other articles on the vehicle body, and maintaining them out of the way of the doors and in secure, safely supported relationship with the automobile body;

Second, to provide a pole carrier for vehicle bodies of this class which conforms to the top of the automobile body adjacent to the drain trough above the doors thereof, with which said carrier is connected, whereby the weight of poles or other objects on said carrier rests substantially against the automobile body and places a minimum of stress on the drain trough thereof;

Third, to provide a pole carrier for vehicle bodies having novel means for connecting the brackets thereof to the conventional drip trough above the doors of the automobile body;

Fourth, to provide a pole carrier for vehicle bodies in which the bracket and the clip connected to the vehicle body trough above the doors does not tend to distort said drain trough, regardless of the amount of connection pressure applied by the clip and the bracket;

Fifth, to provide a pole carrier for vehicle bodies which does not in any way mar or damage a vehicle body, or the finish thereon, when connected thereto;

Sixth, to provide a pole carrier for vehicle bodies of this class having a novel arrangement of a sheath on the bracket thereof which engages the top of the automobile body; and Seventh, to provide a pole carrier for vehicle bodies of this class which is very simple and economical of construction, efficient in operation, and which will not readily deteriorate or get out of order.

Figure 1:
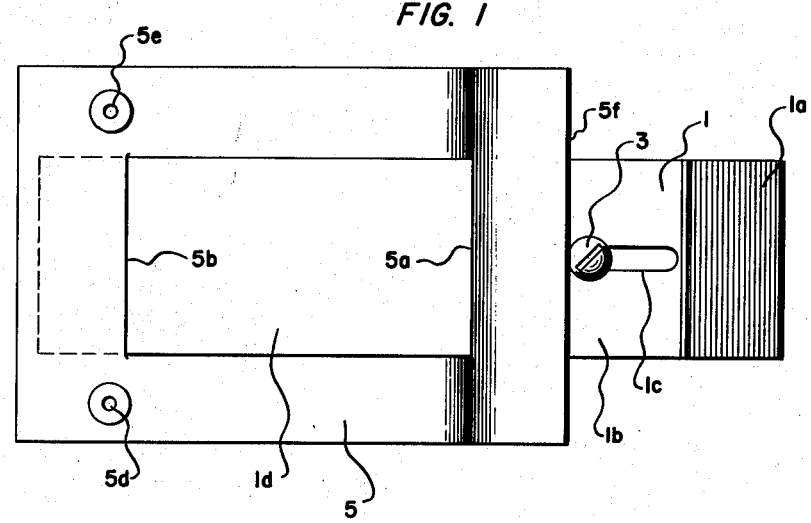
Figure 2:
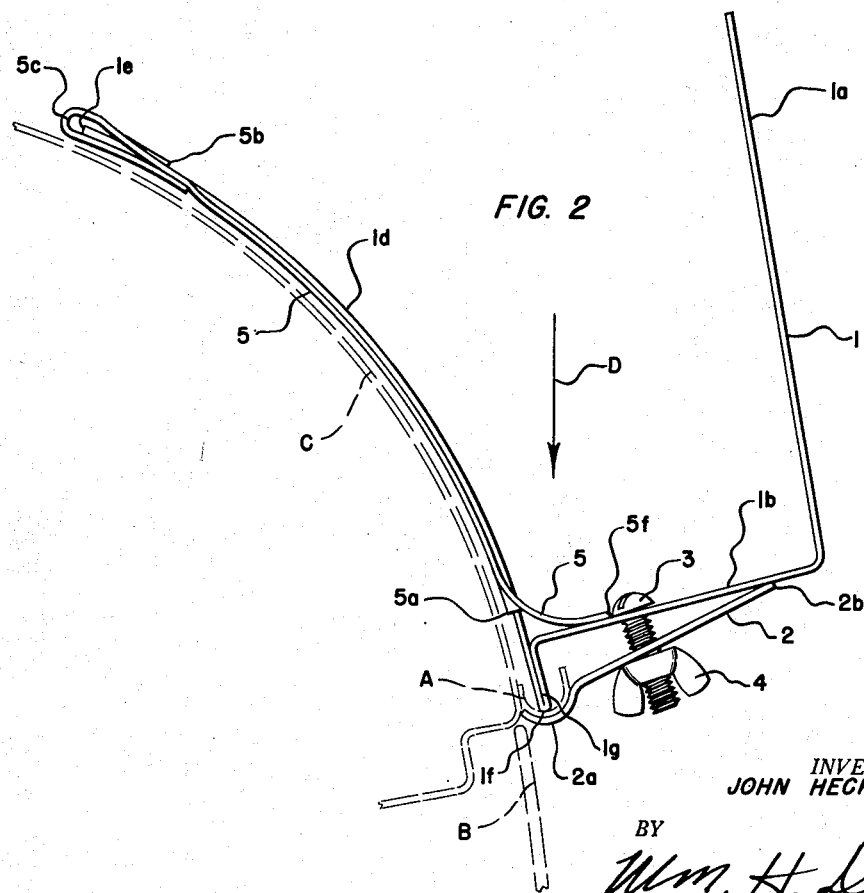

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a top or plan view of my pole carrier for vehicle bodies; and Fig. 2 is an end view thereof, showing by dash lines the position of an automobile body relative thereto, including the conventional drain trough and door frame of the automobile body.

Similar characters of reference refer to similar parts and portions throughout the views of the drawings.

The bracket 1, clip 2, bolt 3, nut 4, and sheath 5, constitute the principal parts and portions of my pole carrier for vehicle bodies.

The bracket 1 is substantially U-shaped and may be made of sheet metal, or any other suitable material, as desired. This bracket 1 is provided with an outer upwardly extending arm portion 1a, having an integral substantially horizontally disposed portion 1b, provided with a slot 1c therein, through which the bolt 3 extends. The inner end of the horizontal portion 1b is provided with a downwardly folded portion 1g, having an integral upwardly curved portion 1d, adapted to conform to the upper curvature of an automobile body adjacent the drain trough A, as indicated by dash lines in Fig. 2 of the drawings.

The sheath 5 is preferably made of leather, or other durable material, and this sheath 5 is provided with slots 5a and 5b, through which the bracket portion 1d extends, as shown best in Fig. 1 of the drawings. The normally upper end of the sheath 5 is provided with a portion 5c, folded over the upper end 1e of the portion 1d of the bracket 1, and the rivets 5d and 5e maintain said folded portion 5b, all as shown best in Figs. 1 and 2 of the drawings. The lower end 5f of the sheath 5 is disposed in an inwardly and downwardly curved position, engaging the horizontal bracket portion 1b, as shown in Fig. 2 of the drawings.

The clip 2 is preferably made of sheet metal, and is provided with an arcuate portion 2a, adapted to engage the lower arcuate side of the automobile drain trough A, and the opposite end 2b of this clip 2 engages the lower horizontal portion 1b of the bracket 1. The bolt 3 extends through the clip 2 and is engaged by the wing nut 4 screw-threaded thereon, which abuts the lower side of the clip 2 and tends to force the horizontal portion 1b and the clip 2 together, which causes pressure to be exerted on the lower edge 1f of the folded portion 1g, at the upper inner side of the drain trough A, in opposed relationship to pressure exerted by the arcuate portion 2a of the clip 2 upwardly at the lower side of the automobile body train trough A.

The operation of my pole carrier for vehicle bodies is substantially as follows:

When connected to an automobile body, as shown in Fig. 2 of the drawings, the clip 2, together with the bracket 1, in assembly, supports poles above the door B, permitting the door B to be readily opened, while the arcuate bracket portion 1d, supported by the sheath 5, engages the upper curved surface C of the automobile body when loaded, and, as indicated by the arrow D, any article placed on the bracket 1 exerts its load very close to the drain trough A or the curved bracket portion 1d, which prevents cantilever bending stresses from being exerted upon the drain trough A.

When several poles are supported on the bracket 1, the center of gravity of all of the poles may be positioned inwardly of the drain trough A, and the load may be borne substantially by the upper portion C of the automobile body.

It will be noted that connection and disconnection of my pole carrier for vehicle bodies with a vehicle body may be readily and easily accomplished by operation of the nut 4 on bolt 3, for tightening or loosening the bracket 1 relative to the drain trough A, as hereinbefore described.

If desired, several of my pole carriers for vehicle bodies may be positioned on opposite sides of the vehicle body in connection with the drain troughs A, and the upper ends 1e, at the loop portions 5c of the sheath 5, may be connected across the top of the automobile body, so that a considerable amount of weight may be borne on the brackets 1, if desired.

In using my pole carrier for vehicle bodies, objects considerably longer than the interior of the automobile body may be carried conveniently and safely, and, due to the fact that poles carried on said carrier are very close to the automobile body, they do not provide a hazardous protrusion which might cause accidents with other vehicles on the highway. The disposition of fishing poles or other articles above the doors of an automobile body maintains them in safe position, and reduces the hazard of breakage during transportation.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a general purpose carrier for vehicle bodies a U-shaped bracket having a substantially horizontal portion and a pair of spaced upwardly extending arms, a return folded rigid reinforcing portion comprising a downward projection of one of said arms to engage the upper inner side of the bottom portion of a conventional automobile body drain trough, a clip comprising a rigid strap having a lip to engage a very limited area of the lower side of an automobile body drain trough in opposed relationship to said folded portion, and a screw for clamping said clip to said horizontal portion and forcing said folded portion toward said clip for engaging upper and lower sides of said bottom portion of the drain trough for rigidly supporting said bracket thereon.

2. In a general purpose carrier for vehicle bodies a U-shaped bracket having a substantially horizontal portion and a pair of spaced upwardly extending arms, a return folded rigid reinforcing portion comprising a downward projection of one of said arms to engage the upper inner side of the bottom portion of a conventional automobile body drain trough, a clip comprising a rigid strap having a lip to engage a very limited area of the lower side of an automobile body drain trough in opposed relationship to said folded portion, and a screw for clamping said clip to said horizontal portion and forcing said folded portion toward said clip for engaging upper and lower sides of said bottom portion of the drain trough for rigidly supporting said bracket thereon, said one of said arms being curved to conform to and be engageable with the top of an automobile body.

3. In a general purpose carrier for vehicle bodies a U-shaped bracket having a substantially horizontal portion and a pair of spaced upwardly extending arms, a return folded rigid reinforcing portion comprising a downward projection of one of said arms to engage the upper inner side of the bottom portion of a conventional automobile body drain trough, a clip comprising a rigid strap having a lip to engage a very limited area of the lower side of an automobile body drain trough in opposed relationship to said folded portion, and a screw for clamping said clip to said horizontal portion and forcing said folded portion toward said clip for engaging upper and lower sides of said bottom portion of the drain trough for rigidly supporting said bracket thereon, said clip having the end thereof remote from said clip engaging the underside of said horizontal portion, and said screw clamping opposed intermediate portions of the clip and horizontal portion.

JOHN HECK, Sr.

REFERENCES CITED

The following references are of record in the file of this patent:

UNITED STATES PATENTS

| Number | Name | Date |
| --- | --- | --- |
| 2,288,442 | Felton | June 30, 1942 |
| 2,461,897 | Hopkins | Feb. 15, 1949 |
| 2,514,266 | Walslager | July 4, 1950 |
| 2,552,879 | Woerner | May 15, 1951 |
| 2,603,394 | Beck | July 12, 1952 |